United States Patent [19]
Brown et al.

[11] 3,789,993
[45] Feb. 5, 1974

[54] CELLULOSIC REVERSE OSMOSIS MEMBRANES HAVING HIGH FLUX AND HIGH SALT REJECTION

[75] Inventors: Barry M. Brown; Elbert L. Ray, both of Rochester, N.Y.

[73] Assignee: Eastman Kodak Company, Rochester, N.Y.

[22] Filed: Jan. 6, 1972

[21] Appl. No.: 215,810

[52] U.S. Cl. .............................. 210/500, 106/196
[51] Int. Cl. ............................................ B01d 31/00
[58] Field of Search ...... 210/500, 321, 23; 106/184, 106/186, 178, 182, 187, 196, 203; 264/41, 49

[56] References Cited
UNITED STATES PATENTS

| | | | |
|---|---|---|---|
| 3,666,508 | 5/1972 | Justice et al. | 210/500 X |
| 3,673,084 | 6/1972 | King et al. | 210/500 X |
| 3,522,335 | 7/1970 | Rowley | 106/186 X |
| 3,527,853 | 9/1970 | Rowley et al. | 106/186 X |
| 3,721,596 | 3/1973 | Drake | 210/321 X |

*Primary Examiner*—Frank A. Spear, Jr.

[57] ABSTRACT

Using cellulose ester dope compositions in which the solvent portion contains a high proportion of formic acid, cellulosic reverse osmosis membranes can be manufactured. These membranes have surprisingly high flux and salt rejection properties, an unexpected resistance to compaction at high pressures over prolonged periods of time and salt rejection properties that are practically independent of applied pressure.

13 Claims, 1 Drawing Figure

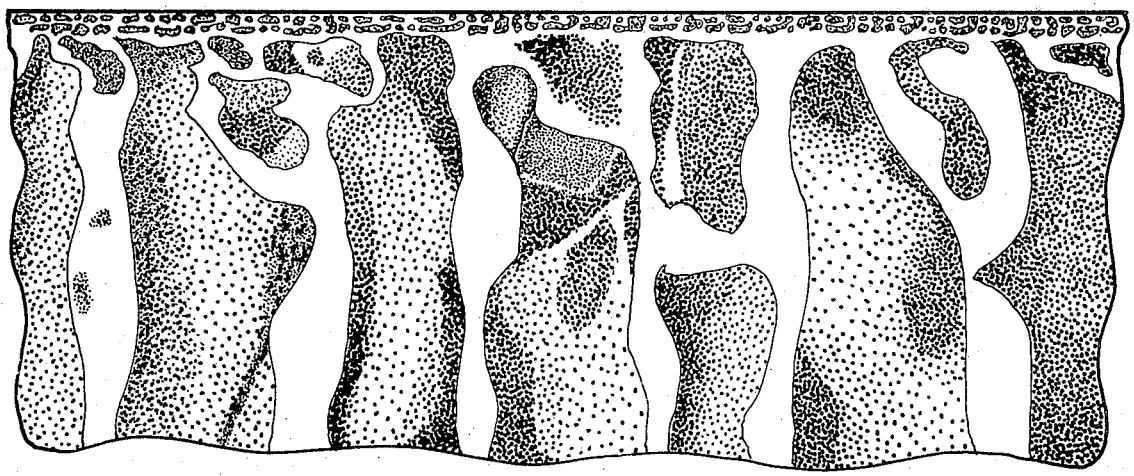

CELLULOSIC REVERSE OSMOSIS MEMBRANES HAVING HIGH FLUX AND HIGH SALT REJECTION

This invention relates to cellulosic membranes having the ability to preferentially exclude dissolved salts when used in so-called "reverse osmosis" processes. More particularly, this invention relates to improved asymmetric cellulose ester membranes having unexpectedly high flux combined with an excellent ability to preferentially exclude dissolved salts when the membranes are used in a "reverse osmosis" process.

It is well known that certain asymmetric cellulosic membranes have a peculiar ability to selectively exclude from passage therethrough dissolved salts when an aqueous solution of such dissolved salts is forced against the membrane with pressure. Such selective exclusion results in relatively purified water passing through the membrane. The processes for purifying water in this way are known as "reverse osmosis" processes, and the membranes having this peculiar ability are known as "reverse osmosis" membranes.

"Reverse osmosis" membranes are made by special processes whereby a special "skin" or layer of selectively effective (for preventing the passage of unwanted dissolved salts through the membrane while simultaneously permitting such passage of purified water) porosity is formed at the surface of the membrane. This "skin," which is generally submicroscopic in thickness, is sometimes termed the "active" layer; the remainder of the membrane usually being relatively porous, with increasing porosity occurring as one proceeds through the membrane in the direction away from the "active" layer. It is apparently this special "skin" that endows these membranes with their valuable selective nature. In turn, the valuable selective nature of useful "reverse osmosis" membranes is apparently dependent upon one or more critical processing parameters or elements such as (1) the particular solvents used in the process (see U. S. Pat. Nos. 3,344,214 and 3,497,072), (2) the presence or absence of certain inorganic and/or organic salts in the casting dope solvent systems (see U. S. Pat. Nos. 3,133,132; 3,133,137; 3,432,584; and 3,522,335), (3) the particular way the membranes are formed from dopes that contain the essential materials (see the above patents and U. S. Pat. No. 3,432,585) and (4) even the particular treatment the resulting membranes receive after they are physically formed.

Ordinarily, reverse osmosis membranes are characterized in terms of their "flux" and their "rejection" properties. "Flux" (F) is the amount of water (in terms of gallons) that can pass through one square foot of a particular membrane in a day. "Rejection" (R) is the percent of sodium chloride removed from a "standard" salt solution which contain 0.5 weight percent NaCl in a single passage through the membrane under certain specified conditions of temperature and applied pressure (room temperature and 600 psi usually). During the testing of reverse osmosis membranes, and during their actual use, a fairly concentrated aqueous solution (containing dissolved materials) is contacted under pressure with the surface of the membrane containing the "active" layer. The pressure may be substantially more than enough to overcome the natural osmotic pressure of the aqueous solution; for example, the use of applied gauge pressures of 600 psi are not uncommon in reverse osmosis processes. The "active" layer selectively excludes from passage through it, the dissolved materials, but permits the passage therethrough of relatively purified water. The purified water is generally collected, and the resulting, still more concentrated, salt solution (that has been retained on the "active" side of the membrane) is removed from the system.

The peculiar properties of the particular membrane that is needed determine the actual production parameters for a given reverse osmosis process and system. Conversely, the particular parameters used in the process whereby the reverse osmosis membrane are manufactured largely affect these "peculiar properties" (i.e., mainly flux and rejection) of the membrane. Many "reverse osmosis" membranes have been made heretofore, each having definite limitations on the maximum "flux" and maximum "rejection" values that can be achieved through their use. Studies have indicated that these properties can be improved to a certain extent by modifying the dope formulation from which they are made and/or modifying the manufacturing process techniques. However, generally heretofore, really optimum F and R properties (based upon those theoretically attainable) have been unattainable due to the nature of the substructure of that part of the membrane immediately underlying the "active" layer.

For truly optimum results, not only must the "active" layer selectively exclude practically all of the minerals dissolved in the "feed" solution [for example, using NaCl solutions, R values of at least 98.6 percent are considered optimum, since sea water can then be converted to excellent potable water in a single pass], but also, the substructure of the membrane (i.e., that portion of the membrane beginning immediately under or adjacent the "active" layer and extending through the membrane) must be extremely porous to the product water, effectively contributing a minimum of "back pressure" to the "reverse osmosis" system.

Actually there are several "pressure" considerations that must be studied and observed in order to optimize any given "reverse osmosis" process or system. A useful formula for such a study is:

$$P = P_A - (P_B + \Delta P_o)$$

where P is the actual effective pressure, $P_A$ is the gauge pressure minus atmospheric pressure, $P_B$ is the back pressure of the substructure, and $\Delta P_o$ is the difference between the respective osmotic pressures of "product" and "feed" water. The back pressure is due to resistance to product water flow through the substructure of the membrane. Experiments have proved that for optimum results, (for example, "flux" of at least 20 gallons per square foot per day and "rejection" of at least 98.6 percent for sea water at 1500 psi applied pressure), an "integral" asymmetric membrane should be used, rather than simply (somehow) applying a micro-thin "active" layer onto a separately prepared very porous support. This is because, to date, sufficiently micro-thin "active" layers that are sufficiently free of surface defects and the like apparently cannot be obtained. Thus, "integral" asymmetric cellulosic membranes (wherein the "active" layer and at least about one mil of substructure have been manufactured as a single membrane in a single coordinated process) are the types of membranes to which the present invention is directed.

Experiments have shown that if the back pressure in conventional commercially practical cellulose ester "reverse osmosis" membranes such as those of earlier workers like Dr. Sidney, Loeb (U. S. Pat. No. 3,133,137), and Dr. M. E. Rowley (U. S. Pat. No. 3,522,335) was somehow made to approach zero, the maximum flux through their membranes could be increased by as much as 25 percent without substantially decreasing the rejection properties of the membranes. However, heretofore, no one knew how to reduce the back pressure in cellulose ester reverse osmosis membranes to a sufficient extent to produce membranes having properties approaching the optimum levels described above.

It has now been discovered that cellulose ester "reverse osmosis" membranes having very high F and R values (i.e., 20 gallons per square foot per day at 600 psi applied pressure with 98$^+$ percent rejection) can be manufactured by (1) using novel "dope" compositions which contain formic acid as a major component, and (2) utilizing a novel manipulative process in the actual manufacture of the membrane from the fluid "dope" compositions of this invention. The resulting reverse osmosis membranes of the present invention have been found (a) to have significantly less substructure back pressure, as compared to those of conventional reverse osmosis membranes, (b) to have considerably higher flux to rejection ratios, (c) to have rejection properties that are less pressure dependent than was heretofore believed possible, and (d) to be surprisingly resistant to "compaction" (a problem that has heretofore been considered a major handicap for practical commercial development of cellulose ester reverse osmosis membranes).

The "dope" compositions that typically can be used in the manufacture of the valuable reverse osmosis membranes of the present invention contain from about 20 to about 35 weight percent of cellulose acetate (or mixture thereof) having an acetyl content of from about 36 to about 41 percent and an intrinsic viscosity (measured in acetone at 25°C) of at least about 0.5. Additionally, such dope compositions contain from about 0.5 to about 10 weight percent of a pore producing material and at least about 55 weight percent of a solvent blend which consists essentially of formic acid and acetone, and contains from about 45 to about 80 weight percent of formic acid. The dope compositions useful in the manufacture of the membranes of this invention can also contain a small amount of water, (preferably less than about 5 weight percent, based on the combined weight of water and formic acid) which water is generally carried into the composition along with the formic acid. It is not believed that water is necessary for the successful practice of the invention.

For optimum results, cellulose acetate(s) containing from about 37.5 to about 40.5 percent acetyl and having an intrinsic viscosity of from about 0.8 to about 1.2 should be utilized in the manufacture of the membranes of the present invention. Also, it is preferred that formic acid represent from about 60 to about 75 weight percent of the volatile (at 105°C under atmospheric pressure) fraction of the dope compositions, and acetone constitute from about 25 to about 40 weight percent thereof. Preferred pore producing materials are those effective amine salts of inorganic strong acids disclosed and claimed in U. S. Pat. No. 3,522,335 issued to Martin E. Rowley on July 28, 1970, such as for example, di-pyridine sulfate, di-triethyl ammonium sulfate, di-triethanol ammonium sulfate, and the like. The disclosure of this Rowley patent is hereby incorporated into the present disclosure by reference.

The dope compositions of the present invention can be prepared by any of several methods whereby the final dope composition is a clear solution having solvent to solids ratio of from about 2:1 to about 4:1, and preferably from about 2.5:1 to about 3.5:1, respectively. For example, in one preferred method, the cellulose ester material is dissolved in the acetone plus a large part of the formic acid, the pore producing material is dissolved in the remainder of the formic acid, (commercial grade), and the resulting solutions are simply stirred together to achieve the desired final dope composition. If desired, pore producing material such as the preferred amine salts described hereinbefore can be prepared in situ by first blending the amine with at least part of the formic acid and subsequently blending into the resulting solution an appropriate amount of strong acid; sulfuric acid, for example. The resulting heat of solution can be useful in aiding the dissolution of the other ingredients of the dope composition.

The preferred processes for manufacturing the membranes of the present invention are actually the subject matter of another patent application which is being filed concurrently with the present patent application under the names of the same inventors. It is United States patent application Ser. No. 215,809 filed Jan. 6, 1972, filed concurrently herewith. Such processes involve, generically, the steps of:

1. Casting the dope composition as a very thin (i.e., generally 0.5–10 mils thick) fluid layer onto the surface of an appropriate web (such as a glass or steel plate, or a relatively hydrophilic surface such as subbed polyester like that described in U. S. Pat. No. 3,636,150);

2. Treating ("developing") the fluid film surface with air or other gas for a very short period of time (e.g., for 15–100 seconds);

3. Immersing (immediately after the "developing" step) the resulting still fluid film into a very hot (from about 100°F to about 190°F) water bath to thereby "hot quench" the dope layer, causing it to gel and set up into the final film structure. During this step, a large proportion of the water miscible organic solvents and the "pore producing material" are removed by extraction from the newly formed membrane into the very hot quench bath.

Still another process for manufacturing some of the present membranes involves using a cellulose acetate dope containing a solvent which consists essentially of formic acid, combined with a very hot initial quench bath like that described above. This process is the subject of another U. S. patent application filed concurrently herewith, Ser. No. 215,809, filed Jan. 6, 1973. Its disclosure is hereby incorporated into the present patent application by reference.

Use of the initial "high temperature" quench (rather than a water quench at room temperature or lower, which is a requisite of conventional processes for manufacturing cellulose ester reverse osmosis membranes), in combination with the use of the formic acid/acetone solvent system in the dope composition surprisingly results in the formation of reverse osmosis membranes having all of the valuable attributes mentioned above;

particular emphasis being placed on the very high flux (low substructure back pressure), very high rejection and excellent resistance to "compaction" properties.

The valuable reverse osmosis membranes of the present invention can readily be characterized in that (a) they contain at least about one percent, and preferably from about 1.5 to about 3.5 percent, of combined formyl in accordance with the test described hereinafter [apparently formic acid reacts favorably to some extent with the cellulose ester(s) in the dope composition] and from about 37 to about 41.5 percent of combined acetyl; (b) they have poroses of at least about 70 percent; (c) they are asymmetric (having an "active" salt excluding layer on one surface and an integral more porous subsurface immediately beneath the "active" layer, with relatively larger pores being formed as one proceeds away from the "active" layer); and (d) they have subsurface fluxes of at least about 10,000 gallons per square foot per day (measured under 600 pounds of applied water pressure) after the "active" layer is lightly removed with very fine emery paper). This very high subsurface flux is more than 50 times as much as subsurface fluxes of conventional reverse osmosis membranes prepared, for example, in accordance with the processes described in U. S. Pat. Nos. 3,344,214, 3,133,137, and 3,522,335. The very high porosity values of the reverse osmosis membranes of the present invention are believed due to the combination of (a) very high initial quench bath temperature and (b) the use of fairly high levels of formic acid in the dope compositions. Measurements of the thickness of product membranes indicates that they are approximately as thick as the initial thickness of the fluid dope composition film, as cast, and sometimes even thicker.

The drawing is illustrative of membranes of the present invention. This is a sketch taken from an electron micrograph of a cross section portion of one of such membranes, in which is shown the extremely porous substructure, beginning almost immediately ajdacent the "active" layer, which is very thin.

In the following example, all parts given are by weight unless otherwise specified.

EXAMPLE

A. Preparation of Dope Composition

A total of 2300 parts of cellulose acetate (having an intrinsic viscosity at 25°C in acetone of 1.15 and containing 39.8 percent acetyl) were dissolved in a blend of 2934 parts of acetone and 3990 parts of formic acid plus 22 parts of water, by stirring the materials together. In a separate container, 350 parts of di-triethyl ammonium sulfate and 400 parts of formic acid were blended until the solution cleared. These two solutions were then blended together to form a clear, fairly viscous dope.

B. Membrane Manufacture

The dope composition prepared in paragraph "A," above, was coated using conventional film-casting equipment as a fluid film about 6 mils thick onto the surface of a slowly moving belt of biaxially oriented poly(ethylene terephthalate) film having a conventional hydrophylic copolymeric "sub" coating (such as is described in U. S. Pat. No. 3,636,150) on its surface. The resulting cast film was exposed to dry 22°C air for 30 seconds and then immersed into an initial quench water bath having a temperature of 125°F. After remaining in the very hot initial aqueous quench bath for about sixty seconds, the resulting membrane was stripped from the casting web and rolled onto a product roll, which was stored under water until it was tested.

C. Testing The Reverse Osmosis Membrane

1. Flux — As used in this disclosure, "flux" means the number of gallons of purified water passed by one square foot of membrane in 24 hours when a solution containing 5,000 ppm (0.5%) of NaCl dissolved in water is continually pressed against the "active" surface of the membrane at room temperature under 600 psi pressure.

2. Rejection — The relative amount, in terms of percent, of dissolved NaCl that is prohibited from passing through the membrane under the conditions specified under "flux," above.

3. Percent Combined Formyl — Method of C. J. Malm, G. F. Nadeau and L. B. Genung, "Analysis of Cellulose Derivatives — Analysis of Cellulose Mixed Esters By the Partition Method," Industrial and Engineering Chemistry, Vol. 14, pg. 292 (1942). The presence of combined formyl in the membranes of the present invention has been confirmed by conventional pyrolytic gas chromatography.

4. Percent Combined Acetyl — Method of C. J. Malm, L. B. Genung, R. F. Williams, and M. A. Pile, "Analysis of Cellulose Derivatives," Industrial and Engineering Chemistry, Vol. 16, pg. 501 (1944).

5. Porosity — The film was wiped clear of surface moisture, weighed and subjected to drying conditions until all moisture was removed. "porosity" equals the volume occupied by water in the water-wet film.

6. Substructure Flux — The active layer was rubbed very lightly with fine emery cloth. The resulting membrane was subjected to water under 600 psi pressure (on the rubbed side). Gallons of water per interval of time through a given area was then measured.

Using an overall membrane manufacturing procedure and a dope preparation procedure as described above, several of the process parameters have been studied, such as the relative "liquid" to "solids" ratio of the dopes. In this study the ratio of formic acid to acetone was held constant (at 60 to 40 by weight), and the weight ratio of cellulose acetate to di-triethyl ammonium sulfate was held constant (at 100 to 23, respectively). Resulting membranes were tested at various pressures ranging from very low (50 psi simulating typical home water pressures) to very high levels. Results are tabulated in Table 1.

TABLE 1

| Liquid/Solid Ratio | PRESSURE (psi) | | | | | | | | | |
|---|---|---|---|---|---|---|---|---|---|---|
| | 50 | | 100 | | 200 | | 600 | | 1500 | |
| | F[1] | R[2] | F | R | F | R | F | R | F | R |
| 2.5 to 1 | 2 | 94 | 6 | 95 | 11 | 96 | 33 | 98.5 | 63 | 98 |
| 2.7 to 1 | 2 | 94 | 6 | 95 | 11 | 96 | 33 | 98 | 63 | 97 |
| 3.0 to 1 | 2 | 94 | 6 | 95 | 11 | 96 | 33 | 98 | 75 | 94 |
| 3.2 to 1 | 2 | 94 | 6 | 95 | 10 | 95 | 35 | 93 | 84 | 65 |
| 3.5 to 1 | 2 | 94 | 6 | 95 | 9 | 95 | 40 | 85 | Membrane collapsed | |

(1) F=flux in gallons per square foot per day
(2) R=rejection (percent of original salt rejected)

The data in Table 1 illustrates the surprising relative independence (independent of pressure) of the rejection properties of the membranes of the present invention. Also illustrated is the surprising resistance of the present membranes (made using L/S ratios of less than 3.2 to 1) to compaction over the short term, since increasing pressure results in a substantial increase in flux without the expected concommitant decrease in salt rejection.

The membrane made according to the "example," above, was also tested for "compaction" over a prolonged period of more than 300 hours. In this test, conventional cellulose ester "reverse osmosis" membranes continue to lose "flux" to an appreciable extent during the test period, and even longer.

TABLE 2 Compaction Data*

| Test Time | Flux | Rejection |
|---|---|---|
| 0(start) | 34 | 98 |
| 100 hrs. | 30 | 98 |
| 200 hrs. | 30 | 98 |
| 300 hrs. | 30 | 98.2 |

*Test solution=0.5% NaCl solution in water. Pressure=600 psi.

The surprisingly valuable ability of the present membranes to resist "compaction" is illustrated in Table 2.

The invention has been described in detail with particular reference to preferred embodiments thereof, but it will be understood that variations and modifications can be effected within the spirit and scope of the invention.

What is claimed is:

1. An asymmetric cellulose ester reverse osmosis membrane characterized by (a) having only one active surface which can selectively exclude from passage therethrough under applied pressure dissolved sodium chloride ions while selectively permitting purified water said passage, (b) having an integral porous substructure immediately adjacent said active surface; said porous substructure having a substructure flux under 600 psi pressure of at least about 10,000 gallons of water per square foot per day; (c) having from about 36 to about 41 percent combined acetyl and at least about 1 percent combined formyl; and (d) having a porosity of at least about 70 percent.

2. An asymmetric cellulose ester reverse osmosis membrane as in claim 1, wherein the amount of combined acetyl is from about 37.5 to about 40.5 percent, and the intrinsic viscosity of said cellulose ester is from about 0.5 to about 1.2 measured in acetone at 25°C.

3. An asymmetric cellulose acetate reverse osmosis membrane as in claim 2, wherein the acetyl content of said cellulose acetate is about 40 percent.

4. A clear dope composition comprising (a) from about 20 to about 35 weight percent cellulose acetate having an acetyl content of from about 36 to about 41 percent and an intrinsic viscosity (measured in acetone at 25°C.) of at least about 0.5 and (b) a pore producing material dissolve in a solvent medium which consists essentially of a blend of formic acid and acetone.

5. A clear dope composition as in claim 4, wherein said pore producing material is an effective amine salt of an inorganic acid; the amount of said amine salt in said dope composition being at least about 0.5 weight percent.

6. A clear dope composition as in claim 5, wherein said formic acid and said acetone are present in a weight ratio, respectively of from about 60 to about 40.

7. A clear dope composition as in claim 6, wherein said cellulose acetate has from about 37.5 to about 40.5 percent acetyl and an intrinsic viscosity of from about 0.8 to about 1.2 measured in acetone at 25°C.

8. A clear dope composition as in claim 5, wherein said amine salt of an inorganic acid is selected from the group consisting of di-pyridine sulfate, di-triethylamine sulfate, and di-triethanol ammonium sulfate.

9. A composition as in claim 8, wherein said amine salt is di-triethylamine sulfate.

10. A composition as in claim 8, wherein said amine salt is di-pyridine sulfate.

11. A composition as in claim 5, wherein the amount of said amine salt in said dope composition is from about 0.5 to about 10 weight percent of said composition.

12. A clear dope composition consisting essentially of:
   a. from about 20 to about 35 weight percent of cellulose acetate or a mixture thereof having an acetyl content of from about 36 to about 41 percent and an intrinsic viscosity measured in acetone at 25°C of from about 0.5 to about 1.2;
   b. from about 0.5 to about 10 weight percent of a pore producing amine salt of an inorganic strong acid; and
   c. at least about 55 weight percent of a solvent blend which consists essentially of formic acid and acetone and contains from about 45 to 80 weight percent of formic acid.

13. A composition as in claim 12, wherein (a) the cellulose acetate has an acetyl content of from about 37.5 to about 40.5 percent and an intrinsic viscosity of from about 0.8 to about 1.2 measured in acetone in 25°C., (b) the formic acid represents from about 60 to 75 weight percent of a fraction of the dope composition which is volatile at 105°C. at atmospheric pressure, (c) the acetone constitutes from about 25 to about 40 weight percent of said composition, and (d) the pore producing amine salt of an inorganic strong acid is selected from the group consisting of di-pyridine sulfate, di-triethylamine and di-triethanol ammonium sulfate.

* * * * *

PO-1050
(5/69)

UNITED STATES PATENT OFFICE
CERTIFICATE OF CORRECTION

Patent No. 3,789,993          Dated February 5, 1974

Inventor(s) Barry M. Brown and Elbert L. Ray

It is certified that error appears in the above-identified patent and that said Letters Patent are hereby corrected as shown below:

Column 4, line 57, change "Serial No. 215,809, filed Jan. 6, 1973" to --Serial No. 215,811, filed Jan. 6, 1972--.

Signed and sealed this 16th day of July 1974.

(SEAL)
Attest:

McCOY M. GIBSON, JR.
Attesting Officer

C. MARSHALL DANN
Commissioner of Patents